(12) United States Patent
Pare, Jr. et al.

(10) Patent No.: US 8,976,674 B2
(45) Date of Patent: *Mar. 10, 2015

(54) METHOD AND SYSTEM TO DETECT PACKETS OF DIFFERENT FORMATS

(75) Inventors: Thomas E. Pare, Jr., Mountain View, CA (US); Kiran Uln, Pleasanton, CA (US)

(73) Assignee: Mediatek Inc., Hsin-Chu (TW)

( * ) Notice: Subject to any disclaimer, the term of this patent is extended or adjusted under 35 U.S.C. 154(b) by 703 days.

This patent is subject to a terminal disclaimer.

(21) Appl. No.: 13/026,128

(22) Filed: Feb. 11, 2011

(65) Prior Publication Data

US 2012/0039315 A1 Feb. 16, 2012

Related U.S. Application Data

(63) Continuation-in-part of application No. 12/563,979, filed on Sep. 21, 2009, now Pat. No. 8,228,806, and a continuation-in-part of application No. 12/700,651, filed on Feb. 4, 2010.

(60) Provisional application No. 61/307,439, filed on Feb. 23, 2010.

(51) Int. Cl.
*H04L 12/26* (2006.01)
*H04L 27/00* (2006.01)
*H04L 27/26* (2006.01)

(52) U.S. Cl.
CPC ......... *H04L 27/0012* (2013.01); *H04L 27/2613* (2013.01)
USPC .......................................... 370/241; 370/338

(58) Field of Classification Search
None
See application file for complete search history.

(56) References Cited

U.S. PATENT DOCUMENTS

| 6,456,860 | B1* | 9/2002 | Nakagaki ...................... 455/561 |
| 7,957,474 | B2 | 6/2011 | Waters et al. |
| 8,228,806 | B2* | 7/2012 | Pare et al. .................... 370/241 |
| 8,238,316 | B2 | 8/2012 | Stacey et al. |
| 8,395,997 | B2 | 3/2013 | Banerjea et al. |
| 2006/0007891 | A1 | 1/2006 | Aoki et al. |
| 2007/0291913 | A1 | 12/2007 | Trainin |
| 2008/0008186 | A1 | 1/2008 | Fan et al. |
| 2008/0212696 | A1 | 9/2008 | Takahashi et al. |
| 2009/0031185 | A1* | 1/2009 | Xhafa et al. ................. 714/751 |
| 2009/0103485 | A1 | 4/2009 | Singh et al. |

(Continued)

FOREIGN PATENT DOCUMENTS

WO WO 2006/001898 1/2006

OTHER PUBLICATIONS

Wikimedia Foundation, Inc. IEEE 801.11, http://en.wikipedia.org/wiki/IEEE_802.11-2007#802.11-2007, pp. 1-11 (Jun. 17, 2010).

(Continued)

*Primary Examiner* — Bunjob Jaroenchonwanit
(74) *Attorney, Agent, or Firm* — Sawyer Law Group, P.C.

(57) ABSTRACT

A method and system in accordance with the present invention presents a new packet structure and an improved method for detecting the packet. The method and system comprise adding an additional field to the packet structure to allow for a sufficient time to process a very high throughput (VHT) signal field; and enabling the detection of the VHT signal field of the packet structure. The VHT signal field is distinguishable from other signal fields and the VHT signal field allows for a backward compatibility with other devices.

11 Claims, 4 Drawing Sheets

(56) References Cited

U.S. PATENT DOCUMENTS

| | | |
|---|---|---|
| 2009/0154427 A1 | 6/2009 | Lee et al. |
| 2010/0027490 A1 | 2/2010 | Mazet et al. |
| 2010/0040158 A1 | 2/2010 | Aggarwal et al. |
| 2010/0046358 A1 | 2/2010 | Van Nee |
| 2010/0046542 A1 | 2/2010 | Van Zelst et al. |
| 2010/0177656 A1 | 7/2010 | Kim et al. |
| 2010/0260159 A1* | 10/2010 | Zhang et al. ............ 370/338 |
| 2010/0290449 A1 | 11/2010 | van Nee et al. |
| 2010/0310002 A1 | 12/2010 | Lauer et al. |
| 2011/0013547 A1 | 1/2011 | Liao et al. |
| 2011/0013721 A1 | 1/2011 | Liao et al. |
| 2011/0051705 A1* | 3/2011 | Jones et al. ............. 370/338 |
| 2011/0096685 A1 | 4/2011 | Lee et al. |
| 2011/0103280 A1* | 5/2011 | Liu et al. ................. 370/311 |
| 2011/0110348 A1 | 5/2011 | Lee et al. |
| 2011/0194475 A1* | 8/2011 | Kim et al. ............... 370/311 |
| 2011/0199953 A1* | 8/2011 | Seok ....................... 370/312 |
| 2011/0206156 A1 | 8/2011 | Lee et al. |
| 2011/0255620 A1* | 10/2011 | Jones et al. ............. 375/260 |
| 2011/0280232 A1* | 11/2011 | Wu et al. ................. 370/338 |
| 2011/0305233 A1* | 12/2011 | Seok ....................... 370/338 |
| 2012/0039315 A1* | 2/2012 | Pare et al. ............... 370/338 |
| 2012/0044925 A1* | 2/2012 | Lee et al. ................ 370/338 |
| 2012/0127940 A1* | 5/2012 | Lee et al. ................ 370/329 |
| 2012/0207232 A1* | 8/2012 | Zhang et al. ............ 375/260 |
| 2012/0269183 A1* | 10/2012 | Sohn et al. .............. 370/338 |
| 2012/0275446 A1 | 11/2012 | Stacey et al. |
| 2013/0010664 A1* | 1/2013 | Kang et al. ............. 370/311 |

OTHER PUBLICATIONS

IEEE Standards Association, IEEE Ratifies 802.11, http://standards.ieee.org/anouncements/ieee802.11n_2009amendment_ratified.html, pp. 1-3 (2009).

Yung-Szu Tu, et al., "Proposed TGac Preamble," doc:..IEEE 802.11-10/0130r0, Los Angeles, CA, USA, Jan. 20, 2010.

\* cited by examiner

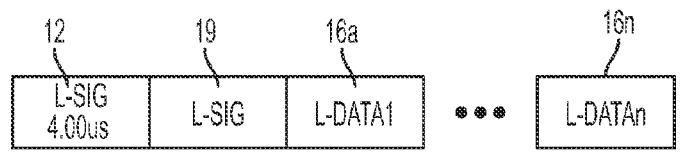
FIG. 1A
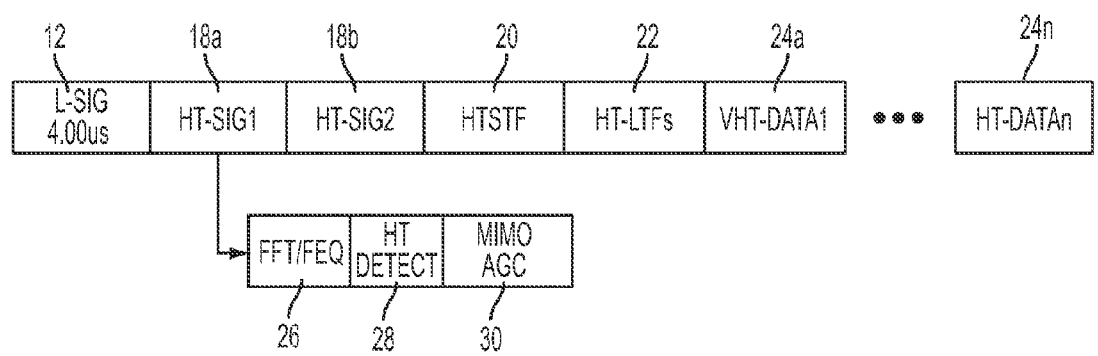
FIG. 1B
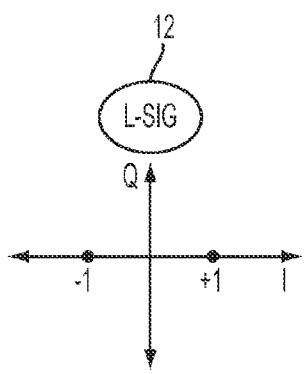 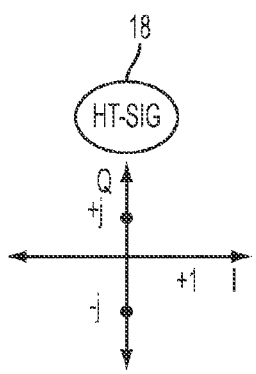 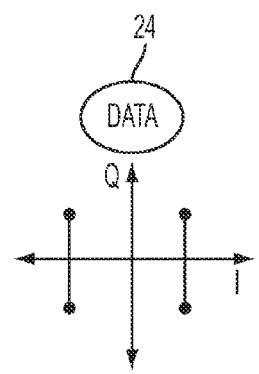
FIG. 2A　　　　FIG. 2B　　　　FIG. 2C

METHOD AND SYSTEM TO DETECT PACKETS OF DIFFERENT FORMATS

CROSS REFERENCE TO RELATED APPLICATIONS

The present application claims the benefit of U.S. Provisional Application No. 61/307,439, filed on Feb. 23, 2010, entitled "COMMUNICATION METHOD AND TRANSCEIVER USING THE SAME," and is a continuation-in-part of U.S. patent application Ser. No. 12/563,979, filed on Sep. 21, 2009, entitled "METHOD AND SYSTEM TO DETECT PACKETS OF DIFFERENT FORMATS IN A RECEIVER," and U.S. patent application Ser. No. 12/700,651, filed on Feb. 4, 2010, entitled "METHOD AND SYSTEM TO DETECT PACKETS OF DIFFERENT FORMATS IN A RECEIVER," all of which are incorporated herein by reference in their entirety.

FIELD OF THE INVENTION

The present invention relates generally to wireless data communication systems and more particularly to the detection of different types of packets.

BACKGROUND OF THE INVENTION

In a wireless communication system such as a WiFi system, information is transmitted and received in orthogonal frequency-division multiplexing (OFDM) packets. A receiver in such a system needs to detect a packet and its format first, and then the receiver configures its hardware and software to receive and decode the data portion of the packet.

Each OFDM packet includes a plurality of pre-amble fields to assist the receiver in detecting, synchronizing, and conditioning the packet. The pre-amble fields are followed by an encoded signal field that carries information about data rate, packet length, modulation and encoding type. The signal field is decoded and then used to configure the receiver to receive and decode the data portion of the packet. In the high throughput (HT) WiFi standard IEEE draft document (802.11n), mixed mode and green field OFDM frame formats are allowed to co-exist with a low throughput legacy frame format. In this standard the mixed mode frame format allows a legacy device to handle an HT packet properly and the green field frame format allows for less overhead and therefore higher throughput in an HT only system.

Accordingly, what is desired is a system and method that allows a receiver to receive and decode data packets in an efficient fashion when the receiver can receive packets in different types of formats. The system and method should be easily implemented, cost effective and adaptable to existing communications systems. The present invention addresses such a need.

SUMMARY OF THE INVENTION

A method and system in accordance with the present invention presents a new packet structure and an improved method for detecting the packet. The method and system comprises adding an additional field to the packet structure to allow for a sufficient time to process a very high throughput (VHT) signal field; and enabling the detection of the VHT signal field of the packet structure. The VHT signal field is distinguishable from other signal fields and the VHT signal field allows for a backward compatibility with other devices.

Other aspects and advantages of the present invention will become apparent from the following detailed description, taken in conjunction with the accompanying drawings, illustrating by way of example the principles of the invention.

BRIEF DESCRIPTION OF DRAWINGS

FIG. 1 illustrates structures of conventional packets.
FIG. 2 illustrates encoding schemes of the conventional packets.

DETAILED DESCRIPTION OF PREFERRED EMBODIMENTS

Figure 3:
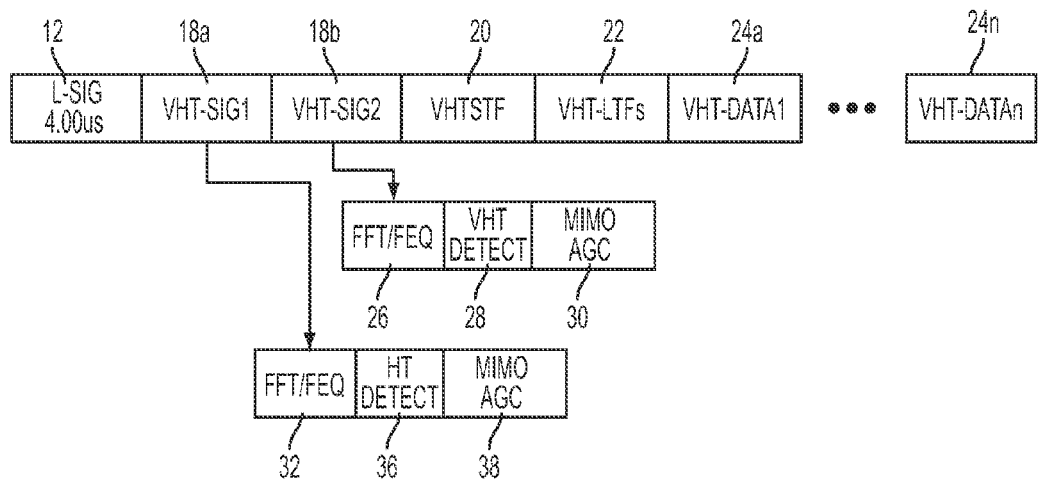
FIG. 3 illustrates a structure of a VHT packet.

The present invention relates generally to communication systems and more particularly to wireless communication systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention allows for a receiver to effectively detect and decode the format of a plurality of packets transmitted in a wireless network. Specifically, the system allows for a receiver which can receive packets in different formats to detect whether the IEE802.11n packets are in a very high throughput (VHT) format or a legacy OFDM format. In so doing, a receiver can operate efficiently when receiving and decoding packets.

Although an embodiment will be described based upon a WiFi system in which OFDM packets are utilized, one of ordinary skill in the art recognizes a system and method in accordance with an embodiment can be utilized in a variety of embodiments and that use would be within the spirit and scope of the present invention. For example, the receiver could receive Complementary Code Keying (CCK) packets, Ethernet packets and the like and their use would be within the spirit and scope of the present invention. For example, the types of high throughput formats may differ from mixed mode format and the green format disclosed herein but those formats would still be applicable in a system and method in accordance with the present invention. Accordingly, although the system and method in accordance with the present invention will be discussed in the context of a particular embodiment, one of ordinary skill in the art recognizes that it can be utilized in a variety of environments and is not limited to the embodiments described herein.

A system that utilizes a detection procedure in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the detection procedure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

FIG. 1 shows the structures of conventional packets. The portion (a) illustrates a packet structure 10 used in a wireless device complying with IEEE 802.11a standard (legacy mode), while the portion (b) illustrates a high throughput (HT) packet structure 10 used in a wireless device complying with the IEE 802.11n standard. The portion (a) shows the portion of the 11a legacy packet following the short and long training fields (SFT and LTF), which are primarily for packet detection, auto gain control (AGC) and channel training. The signal field, as defined in the specification IEEE 802.11a standard, contains the signal information pertaining to the data portion of the packet, such as data modulation, number of symbols, coding rate, and parity bit protection. A receiver that receives the packet uses this information, contained in the L-SIG symbol 12 and 14 shown in the portion (a), to set-up the subsequent decoding processing the data symbols. The IEEE 802.11a standard defines a packet data rate of up to 54 Mb/s.

With the release of the draft IEEE 802.11 standard, a new preamble of the packet is defined to a packet data rate of 600 Mb/s. The new preamble requires an extensive set of signal parameters that necessitates the expansion of the signal field into two symbols, such as the HT-SIG1 18a and HT-SIG2 18b shown in the portion (b), immediately following the L-SIG 12 field. To ensure co-existence with the 11a devices, the HT-SIG fields 18a and 18b are modulated with a 90-degree rotation. Compared with a conventional BPSK symbol with real components, the HT-SIG fields 18a and 18b are signaled on the imaginary (Q) axis, as shown in FIG. 2. This makes the detection of the packet easy, after processing the symbol through signal processing modules, such as the FFT and FEQ modules 26 shown in portion (b). As depicted in portion (b), the approximate time duration that an 11n device will require to detect an HT packet by HT detector 23 is approximately 1 symbol time (or about 4 microseconds). That is, the signal processing time, such as the FFT/FEQ/HT-DETECT 28 process shown in the portion (b), begins from the last HT-SIG1 18a sample transmitted by the transmitter, and will be completed before the HT-STF 20 is transmitted over the air, or received by a receiver. Thus, upon detection, an 11n receiver has enough time to properly process the HT-STF field 20. During this field, the analog and digital MIMO-AGC 30 functions are performed, using the HT-STF signal that is specially designed for this purpose; for example, the 802.11a/n STF field 20 has a low peak-to-average power ratio, which ensures that the signal can tolerate large power increases, without saturating the receiver analog-to-digital converters.

MIMO-AGC 30 is important for performance prior to the reception of the HT-LTF 22 (long training fields). Significant gain changes can occur at the start of the HT-STF 20 for several reasons. For example, CSD changes (from 200 up to 600 microseconds on the transmitted spatial streams) can drastically change the effective wireless channel. Transmit beamforming can also result in 6 to 10 dB of received signal gain increase, and transmit antenna diversity schemes starting at the HT-STF 20 (according to the 11n standard) and spatial expansion (also an 802.11n feature, whereby the transmitter activates additional transmitters) can further modify the channel. These abrupt changes need to be compensated by the MIMO-AGC 30 to prevent effects such as analog-to-digital conversion (ADC) saturation (clipping).

Moreover, with a very high throughput (VHT) standard, which offers even higher data rates, a preamble field must be designed to allow a VHT device to coexist with both 11a and 11n devices. The signal field will preferably be as efficient as the HT-SIG field 18a and 18b, immediately following the L-SIG field 12 as shown in FIG. 1, and allow the VHT preamble to be uniquely distinguishable from the previous two preambles, and finally, and equally important, the VHT detection is required to be timely, so that the VHT detection occurs before the start of the HT-STF symbol 20 so that a full symbol time (i.e., four microseconds) is available for MIMO-AGC 30.

An approach known to solve the current problem is shown in FIG. 3. In this embodiment 90-degree rotation is used on the HT-SIG2 field 18b for VHT detection. HT and VHT detection is done sequentially, with the VHT 28 and 30 detection logic searching for the 90-degree shift on either the first signal field 18a (indicating the 11n HTpacket) or the second signal field 18b (indicating the VHT packet is present).

Figure 4:
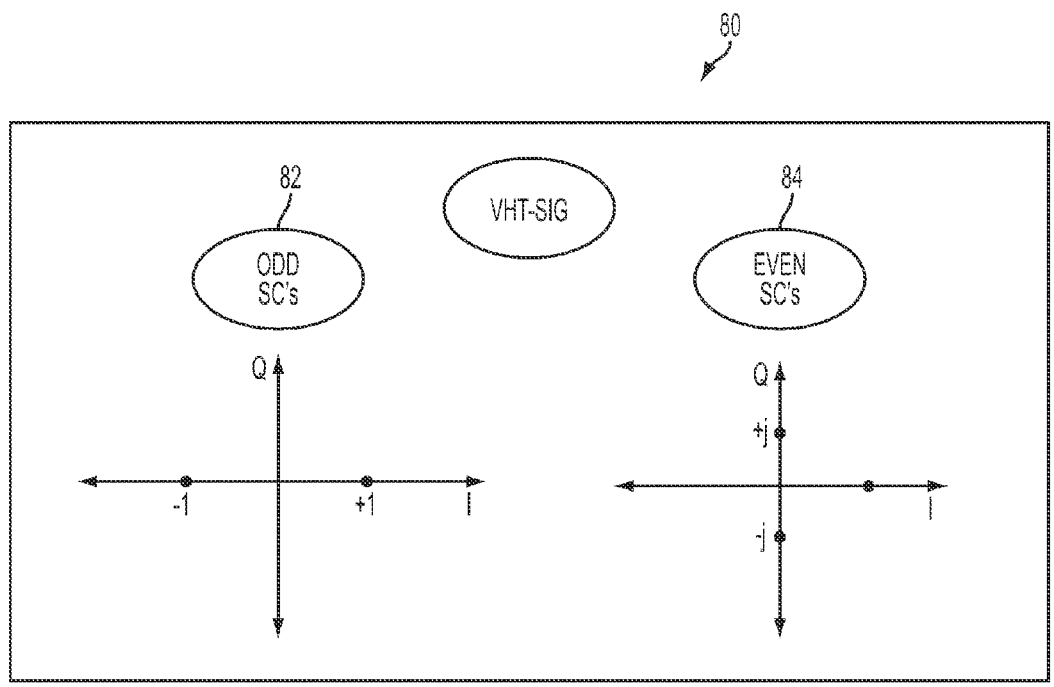
FIG. 4 shows the constellation diagrams of the odd subcarriers and the even subcarriers.

The approach for example, can be taken to generalize the 90-degree rotation so that the new VHT-SIG can be easily recognized. That is, it can be distinguished from both an HT-SIG field and a legacy DATA field simultaneously. One embodiment of the design utilizes 90-degree BPSK symbols on alternating subcarriers, odd and even, as shown in FIG. 4. FIG. 4 shows the constellation diagrams of the odd subcarriers 82 and the even subcarriers 84. Using a detection scheme, this preamble will accomplish the VHT coexistence requirement.

Figure 5:
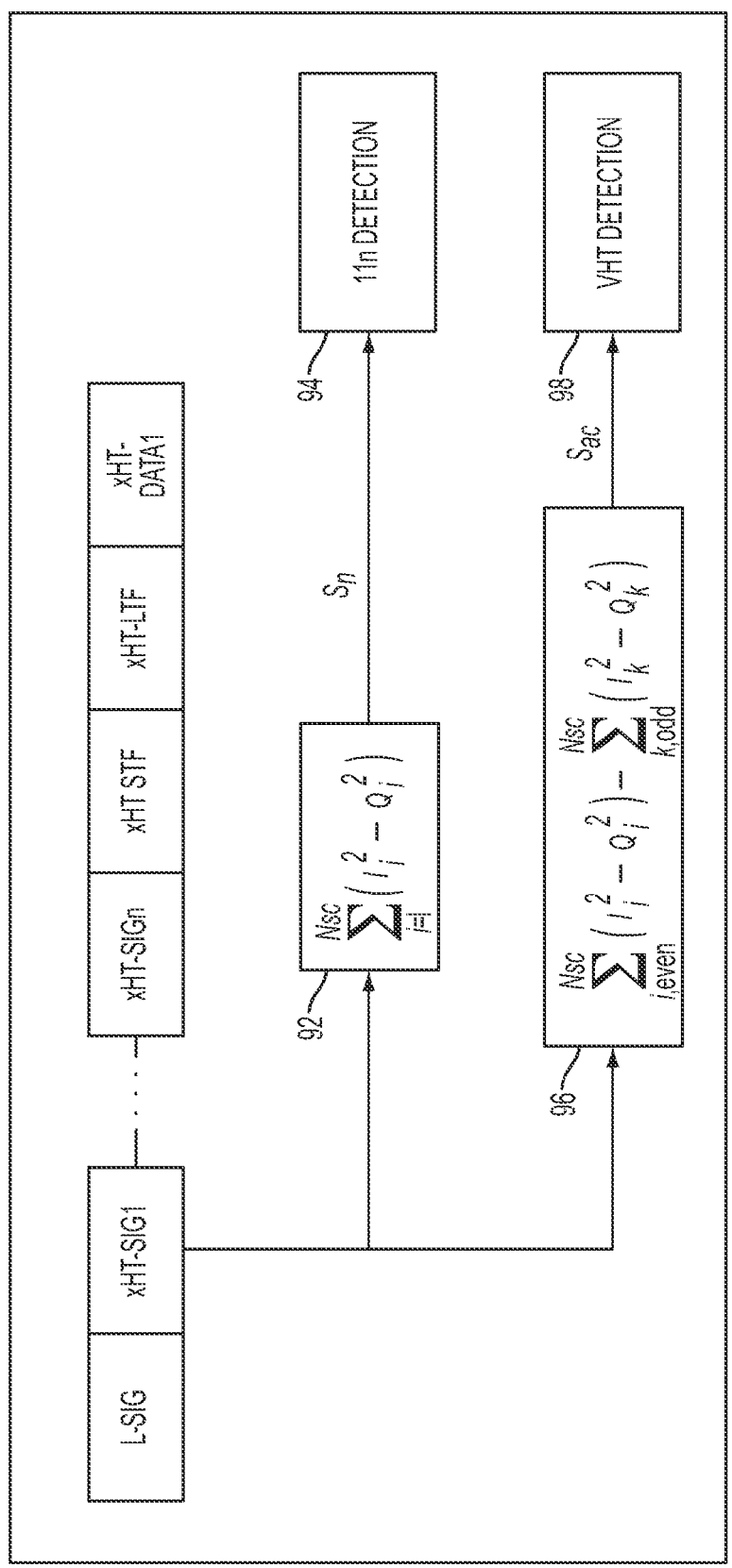
FIG. 5 is an approach to distinguish the 11n HT-SIG field.

An approach to distinguishing the 11n HT-SIG field is shown in FIG. 5. Here the 11n HT-SIG field is distinguished by summing the difference in power between the real (I component) and imaginary (Q component) BPSK symbols, across all of the rotated subcarriers. This is shown as element 92 as is written as:

$$11n: \sum_{i=1}^{Nsc}(I_i^2 - Q_i^2)$$

In particular, if the packet is an 11n packet with the 90-degree shifted BPSK OFDM symbol, all the energy will line up on the imaginary axis, making the Q components large. The output will be a large negative number received by 11n detection mechanism 94. It will be distinguishable from an 11a packet, because the 11a packet will have a data symbol in that corresponding time slot. In general, the data symbol in QAM, and contains equal energy on both I and Q components, so that if the packet is 11a, the output of the 11n detector will read zero. Thus, by comparing the summed output to a preset negative threshold, the 11n and 11a can be uniquely identified.

Using the alternating 90-degree BPSK OFDM to signal the VHT-SIG field, the corresponding form of the detector 96 takes the modified form:

$$11ac: \sum_{i,even}^{Nsc}(I_i^2 - Q_i^2) - \sum_{k,odd}^{Nsc}(I_k^2 - Q_k^2),$$

where the summations are over even and odd subcarriers. The output will be a large negative value received by VHT detection mechanism 98 when the VHT-SIG field is present. Summarizing the detection outputs, where S is the largest possible value of the detectors, as shown in Table 1, we see the this the new VHT signal detection scheme is equally effective as that for the current 11n system, where both will output a value of −S with the respective signal field inputs, and 0 if they encounter a data symbol. Similarly, each will output a zero value when the respective input the other type of signal field.

| Metric | Data Symbol | 11a L-SIG | 11n HT-SIG | VHT-SIG |
|---|---|---|---|---|
| 11n | 0 | S | −S | 0 |
| VHT | 0 | 0 | 0 | −S |

Although this method operates effectively in, any environments, it does not operate as well when the MIMO-AGC 30 is pushed out until the very end of the VHT-STF field 20 as shown in FIG. 3, and into the VHT-LTF field 22, where channel training is supposed to occur in the receiver. During the channel training, it is almost not possible to adjust the analog RF gain circuits without corrupting the training signal, and causing a packet error. Thus, there is a need to correct the disadvantage in the delayed-90 degree sequential VHT packet detention.

Figure 6:
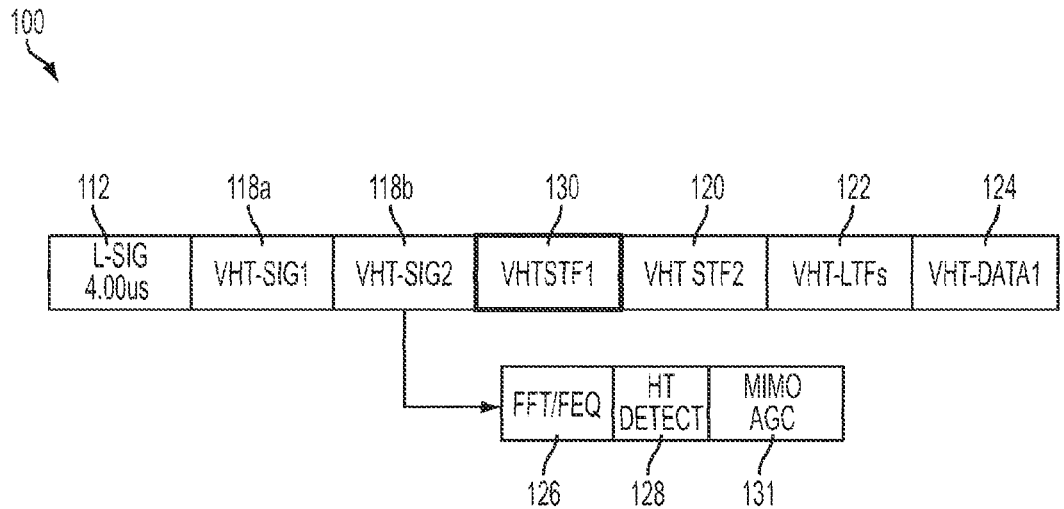
FIG. 6 illustrates a structure of a VHT packet according to an embodiment of the present invention.
Figure 7:
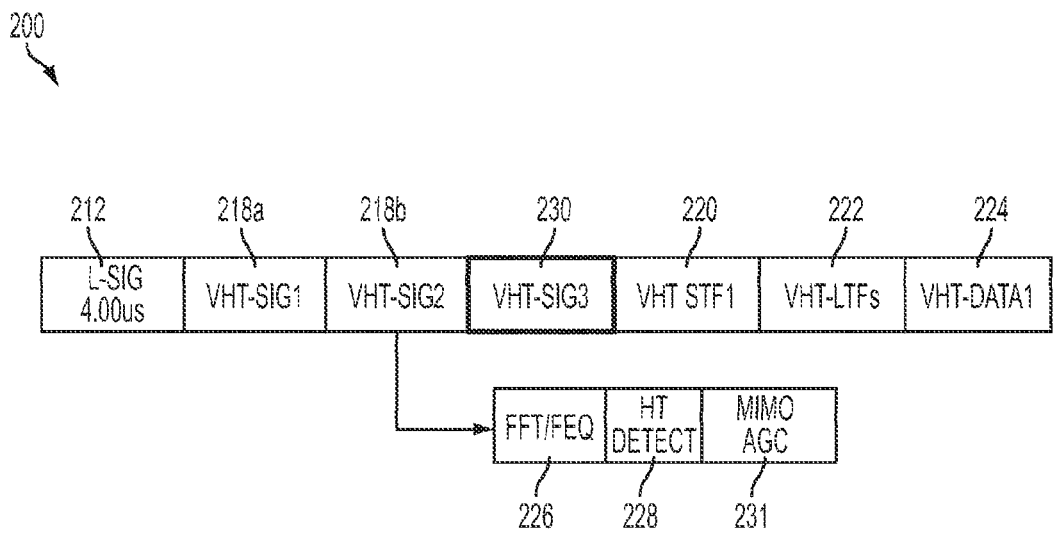
FIG. 7 illustrates a structure of another VHT packet according to another embodiment of the present invention.

Referring now FIG. 6 and FIG. 7, packet structures are provided for addressing the MIMI-AGC processing problem when used with delayed-90 degree VHT detection. The solution is to add an additional field to allow for a sufficient time enough to process the VHT-SIG2 field through a signal processing unit, such as the FFT 20/HT Detection logic, so that the MIMO-AGC process has a full VHT-STF (at least, or near 4 microseconds) and may properly settle the analog circuits prior to the start of the VHT-LTF fields (channel training).

According to an embodiment of the present invention, a communication method for transmitting packets comprises the step of transmitting a packet of the structure shown in FIG. 6. The packet 100 is designed to contain two short training fields (STF) 130 and 120 or a double width VHT-STF section, and therefore allows adequate time for detecting the packet by HT detection logic128 and for processing by MIMO-AGC 131.

According to another embodiment of the present invention, a communication method for transmitting packets comprises the step of transmitting a packet of the structure shown in FIG. 7. The packet 200 shown in FIG. 7 has a third signal field VHT-SIG3 230 added prior to the start of the VHT-STF signal field 220. This additional signal field can be designed to contain additional user specific information, such as user MAC address indicating the intended client for the incoming packet. This would allow unintended users to ignore the incoming packet, and enter into a power-save mode.

Moreover, source address information can also be added to the third signal field 230. This would allow a particular client to discriminate between certain packets. For example, a handheld device that is only interested in data email traffic might want to ignore a high bandwidth 11ac packet that contains HD video streaming data from a wireless BD player, that is intended for a large wall-mounted screen HD video display. By allowing the client to ignore this traffic would allow it to extend its battery life, and free up its processor for other activities. Source information contained in the VHT-SIG3 230 can help to achieve this goal.

Accordingly, a method and system in accordance with the present invention presents a new packet structure and an improved method for detecting the packet. In such a system or method by adding an additional field to the packet structure to allow for a sufficient time to process a very high throughput (VHT) signal field; and enabling the detection of the VHT signal field of the packet structure and ensuring MIMO AGC processing has sufficient time to process the VHT-STF field. Therefore, the VHT signal field is distinguishable from other signal fields and the VHT signal field allows for a backward compatibility with other devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of communicating packets of different formats in a transmitter, the method comprising:
   adding an additional field in a packet structure, wherein the additional field is used to allow for a sufficient time to process a VHT signal field before processing a VHT short training field (VHT-STF) in a detection of the VHT signal field; and,
   enabling the detection of the VHT signal field of the packet structure, wherein the VHT signal field is distinguishable from other signal fields; wherein, the VHT signal field allows for a backward compatibility with other devices, wherein the additional field comprises source address information for allowing a particular client to discriminate between different type packets.

2. The method of claim 1, wherein adding the additional field between the VHT signal field and the VHT-STF of the packet structure,
   and the additional field comprises an additional short training field.

3. The method of claim 1 whereby the transmitter transmits at least one signal field symbol and is capable of transmitting a plurality of 802.11 signal fields, the plurality of 802.11 signal fields including the VHT signal field.

4. The method of claim 1 wherein the VHT signal field comprises 90 degree rotated binary phase shift keying (BPSK) subcarriers.

5. The method of claim 4 wherein the BPSK rotation is on alternating subcarriers.

6. The method of claim 1 wherein the additional field includes additional user specific information.

7. The method of claim 1 wherein the additional field includes a user MAC address, or similar identifying information that indicates the intended client for an incoming packet.

8. A computer program product stored on a non-transitory computer readable medium for causing a computer to control an execution of an application to perform a method for communicating packets of different formats in a transmitter, the transmitter comprising a signal field; comprising:
  adding an additional field between a very high throughput (VHT) signal field and a VHT short training field (VHT-STF) of a packet structure, the additional field is used to allow for a sufficient time to process a VHT signal field before processing the VHT-STF in a detection of the VHT signal field;
  enabling the detection of a VHT signal field wherein the VHT signal field is distinguishable from other signal fields;
  wherein the VHT signal field allows for a backward compatibility other devices, and the additional field comprises source address information for allowing a particular client to discriminate between different type packets.

9. The computer program product of claim 8 wherein the additional field comprises additional user specific information.

10. The computer program product of claim 8 wherein the additional field includes a user MAC address, or equivalent identifying information, that indicates the intended client for an incoming packet.

11. The computer program product of claim 8 wherein the additional field comprises an additional short training field.

* * * * *